United States Patent
Kim et al.

(10) Patent No.: US 8,279,367 B2
(45) Date of Patent: Oct. 2, 2012

(54) BACKLIGHT ASSEMBLY, LIQUID CRYSTAL DISPLAY APPARATUS HAVING THE SAME AND METHOD OF MANUFACTURING THE SAME

(75) Inventors: Yong-Il Kim, Suwon-si (KR); Hyun-Su Park, Suwon-si (KR); Young-Ho Lee, Suwon-si (KR); Jae-Hwan Chun, Suwon-si (KR); Sung-Won Chung, Cheonan-si (KR)

(73) Assignee: Samsung Electronics Co., Ltd. (KR)

( * ) Notice: Subject to any disclaimer, the term of this patent is extended or adjusted under 35 U.S.C. 154(b) by 343 days.

(21) Appl. No.: 12/466,601

(22) Filed: May 15, 2009

(65) Prior Publication Data

US 2009/0310058 A1    Dec. 17, 2009

(30) Foreign Application Priority Data

Jun. 17, 2008    (KR) ................ 2008-56801

(51) Int. Cl.
*G02F 1/1333*    (2006.01)
*F21V 7/04*    (2006.01)
*H01R 33/02*    (2006.01)

(52) U.S. Cl. .......... 349/58; 349/149; 362/631; 362/633; 439/226; 439/558

(58) Field of Classification Search ................ None
See application file for complete search history.

(56) References Cited

U.S. PATENT DOCUMENTS

| | | | | |
|---|---|---|---|---|
| 4,005,924 | A * | 2/1977 | Nestor | 439/57 |
| 7,549,880 | B2 * | 6/2009 | Miyazono et al. | 439/232 |
| 7,837,377 | B2 * | 11/2010 | Lee et al. | 362/633 |
| 7,854,541 | B2 * | 12/2010 | Kim | 362/646 |
| 2008/0139008 | A1 | 6/2008 | Lee et al. | |

FOREIGN PATENT DOCUMENTS

| | | |
|---|---|---|
| CN | 101098063 A | 1/2008 |
| JP | 2007-257881 A | 10/2007 |
| KR | 10-2007-0025647 A | 3/2007 |
| KR | 10-2007-0066197 A | 6/2007 |

* cited by examiner

*Primary Examiner* — Hemang Sanghavi
(74) *Attorney, Agent, or Firm* — Cantor Colburn LLP (57) ABSTRACT

A backlight assembly includes a lamp socket unit, a printed circuit board and a lower receiving container. The printed circuit board includes a cutout portion which receives the lamp socket unit therethrough. The lower receiving container receives the lamp socket unit and the printed circuit board. The lamp socket unit is coupled to the printed circuit board, and the printed circuit board, having the lamp socket unit coupled thereto, is disposed in the lower receiving container.

23 Claims, 8 Drawing Sheets

BACKLIGHT ASSEMBLY, LIQUID CRYSTAL DISPLAY APPARATUS HAVING THE SAME AND METHOD OF MANUFACTURING THE SAME

This application claims priority to Korean Patent Application No. 2008-56801, filed on Jun. 17, 2008, and all the benefits accruing therefrom under 35 U.S.C. §119, the contents of which in its entirety are herein incorporated by reference.

BACKGROUND OF THE INVENTION

1. Field of the Invention

The present invention relates to a backlight assembly. More particularly, the present invention relates to a backlight assembly having a lamp socket unit, a liquid crystal display having the backlight unit and a method of manufacturing the backlight unit.

2. Description of the Related Art

A liquid crystal display ("LCD") device is a type of flat panel display device which displays an image using optical and electrical characteristics of liquid crystals interposed between two substrates.

The LCD device typically includes a liquid crystal control unit and a light supplying unit. The liquid crystal control unit controls an alignment of the liquid crystals. The light supplying unit supplies the liquid crystal control unit with light. The LCD device may include, for example, an LCD panel as the liquid crystal control unit and a backlight assembly as the light supplying unit.

The backlight assembly generally includes a light source which generates the light. In addition, the backlight assembly is typically classified as either an edge illumination type backlight assembly or, alternatively, a direct illumination type backlight assembly. The edge illumination type backlight assembly includes a light-guide plate adjacent to a lamp. The light-guide plate guides the light toward the LCD panel. On the other hand, the direct illumination type backlight assembly includes a diffusion plate adjacent to a lamp to diffuse light generated from the lamp onto the LCD panel.

In both the edge illumination type and the direct illumination type backlight assemblies, a lamp socket fixes the lamp to a receiving container. In the direct illumination type backlight assembly, however, a plurality of lamps is typically provided. Thus, the plurality of lamps are aligned in the receiving container using an aligning plate to fix lamp sockets of corresponding lamps to the receiving container.

When the backlight assembly includes the lamp sockets and the aligning plate to fix the lamps to the receiving container, as in the direct illumination type backlight assembly, a manufacturing process of an LCD device having the direct illumination type backlight assembly becomes complicated in comparison with the edge illumination type backlight assembly. In addition, a die and a mold for the lamp sockets and the aligning plate are required, and manufacturing costs, as well as a total number of required manufacturing elements are both increased. Further, impurities flow into a space created between the lamp sockets and the aligning plate during or after the manufacturing process. Additionally, a location of the lamp sockets changes as a shape of the LCD device is changed, e.g., by expansion or contraction during the manufacturing process. As a result, a shape of the aligning plate changes. Thus, the manufacturing costs and a manufacturing time are further increased.

Therefore, it is desired to develop a backlight assembly having lamps securely fixed therein, but does not require an aligning plate to fix the lamps to a receiving container thereof.

BRIEF SUMMARY OF THE INVENTION

Exemplary embodiments of the present invention provide a backlight assembly including a lamp socket unit and a printed circuit board. More specifically, exemplary embodiments of the present invention provide a backlight assembly having advantages such as, but not limited to, easy assembly and reduced manufacturing costs thereof.

Exemplary embodiments of the present invention also provide a liquid crystal display including the backlight assembly, and a method of manufacturing the backlight assembly.

According to an exemplary embodiment of the present invention, a backlight assembly includes a lamp socket, a printed circuit board and a lower receiving container. The printed circuit board includes a cutout portion which receives the lamp socket unit therethrough. The lower receiving container receives the lamp socket unit and the printed circuit board. The lamp socket unit is coupled to the printed circuit board. The printed circuit board, having the lamp socket unit coupled thereto, is disposed in the lower receiving container.

The lamp socket unit includes a socket terminal and a socket housing which receives the socket terminal. The socket housing includes a base portion and a main portion extending in a substantially perpendicular direction away from the base portion. The base portion is coupled to the printed circuit board.

The main portion may include a terminal receiving space formed therethrough, and the terminal receiving space may receive the socket terminal of the lamp socket unit therethrough.

The printed circuit board may further include a fixing groove formed around the cutout portion of the printed circuit board on a lower surface thereof, and the socket housing is inserted into the cutout portion of the printed circuit board.

The socket housing further includes a fixing protrusion formed on the base portion thereof at a position substantially corresponding to a position of the fixing groove of the printed circuit board when the fixing protrusion is coupled to the fixing groove when the socket housing is inserted into the cutout portion of the printed circuit board.

The printed circuit board further may further include a plurality of the cutout portions and a coupling aperture formed through the printed circuit board. In this case, the coupling aperture is disposed between adjacent cutout portions of the plurality of cutout portions.

The lower receiving container may include a bottom surface and a recess formed in the bottom surface. A position of the recess corresponds to a position of the lamp socket disposed in the lower receiving container, the recess extends away from the lamp socket, a fixing boss is formed on a surface of the recess facing the printed circuit board disposed therein, and the fixing boss thereby contacts the printed circuit board when the printed circuit board is disposed in the lower receiving container.

The fixing boss includes a fixing aperture formed thereon at a position corresponding to a position of the coupling aperture of the printed circuit board when the printed circuit board is disposed in the lower receiving container.

The backlight assembly may further include a coupling member inserted through the fixing aperture and the coupling aperture to fix the printed circuit to the lower receiving container. The coupling member may be a screw.

The backlight assembly may further include a side mold and a lamp disposed in the lower receiving container. The side mold is disposed at a peripheral edge of the lower receiving container, a longitudinal axis of the side mold extends in a substantially perpendicular direction relative to a longitudinal axis of the lamp, and the side mold covers an end portion of the lamp.

The socket terminal may include: a main body; an electrode gripping portion disposed at an upper portion of the main body; a first printed circuit board coupling portion disposed at a lower portion of the main body on a first side of the main body; and a second printed circuit board coupling portion disposed at the lower portion of the main body on a second side of the main body, the second side being opposite to the first side.

The electrode gripping portion may be integral to the main body, e.g., an extension of the main body.

The electrode gripping portion may include an electrode receiving groove formed in the main body and an electrode holding portion disposed in the electrode receiving groove and which receives an electrode of the lamp.

The first side of the main body faces the lamp disposed in the lower receiving container.

The second circuit board coupling portion may protrude from opposite side walls of the lower portion of the main body.

In an alternative exemplary embodiment of the present invention, a liquid crystal display includes a liquid crystal panel, a lamp disposed below the liquid crystal panel, a lower receiving container which receives the lamp, a lamp socket unit disposed in the lower receiving container and which holds the lamp, and a printed circuit board comprising a cutout portion formed therethrough and which receives the lamp socket unit therethrough. The lamp socket unit includes a socket terminal and a socket housing which receives the socket terminal. The printed circuit board is disposed in the lower receiving container.

The printed circuit board may further include a fixing groove formed around the cutout portion of the printed circuit board on a lower surface thereof, and the socket housing may include: a base portion coupled to the printed circuit board; and a main portion extending in a substantially perpendicular direction away from the base portion. The socket housing is inserted into the cutout portion of the printed circuit board.

The liquid crystal display may further include a plurality of the cutout portions, and the socket housing may include a fixing protrusion formed on the base portion at a position substantially corresponding to a position of the fixing groove of the printed circuit board when the fixing protrusion is coupled to the fixing groove when the socket housing is inserted into the cutout portion of the printed circuit board. The printed circuit board may include a coupling aperture formed in the printed circuit board at a position between adjacent cutout portions of the plurality of cutout portions.

The lower receiving container includes a bottom surface and a recess formed in the bottom surface. A position of the recess corresponds to a position of the lamp socket disposed in the lower receiving container,
the recess extends away from the lamp socket, a fixing boss is formed on a surface of the recess facing the printed circuit board disposed therein, and
the fixing boss contacts the printed circuit board when the printed circuit board is disposed in the lower receiving container.

The liquid crystal display further includes a coupling member inserted through the fixing aperture and the coupling aperture to fix the printed circuit to the lower receiving container, and a side mold disposed at a peripheral edge of the lower receiving container. A longitudinal axis of the side mold extends in a substantially perpendicular direction relative to a longitudinal axis of the lamp, and the side mold covers an end portion of the lamp.

In still another alternative exemplary embodiment of the present invention, a method of manufacturing a backlight assembly includes providing a lower receiving container. The lower receiving container includes: a bottom surface; a recess formed in the bottom surface; a fixing boss disposed in the recess; and a fixing aperture formed in the fixing boss. The method further includes disposing a printed circuit board on the fixing boss in the recess. The printed circuit board includes: a cutout portion formed in the printed circuit board and a fixing groove formed on a bottom surface of the printed circuit board around the cutout portion. The method further includes fixing a lamp socket unit in the cutout portion. The lamp socket unit includes: a socket terminal and a socket housing which receives the socket terminal. The printed circuit board having the lamp socket unit fixed in the cutout portion thereof is disposed in the lower receiving container.

The fixing aperture may be formed through the fixing boss at a position corresponding to a position of a coupling aperture formed in the printed circuit board, and a coupling member may be inserted through the fixing aperture and the coupling aperture to fix the printed circuit to the lower receiving container.

BRIEF DESCRIPTION OF THE DRAWINGS

The above and other aspects, features and advantages of the present invention will become more readily apparent by describing in further detail exemplary embodiments thereof with reference to the accompanying drawings, in which.

DETAILED DESCRIPTION OF THE INVENTION

The invention will now be described more fully hereinafter with reference to the accompanying drawings, in which exemplary embodiments of the invention are shown. The present invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

Exemplary embodiments of the present invention are described herein with reference to cross section illustrations, which are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes which result, for example, from manufacturing. For example, a region illustrated or described as flat may, typically, have rough and/or nonlinear features. Moreover, sharp angles which are illustrated may be rounded. Thus, the regions illustrated in the figures are schematic in nature and their shapes are not intended to illustrate the precise shape of a region and are not intended to limit the scope of the present invention.

Hereinafter, exemplary embodiments of the present invention will be described in further detail with reference to the accompanying drawings.

A backlight assembly including a lamp socket unit according to an exemplary embodiment of the present invention, and a liquid crystal display including the backlight assembly will now be described in further detail with reference to FIGS. 1 through 5.

Figure 1:
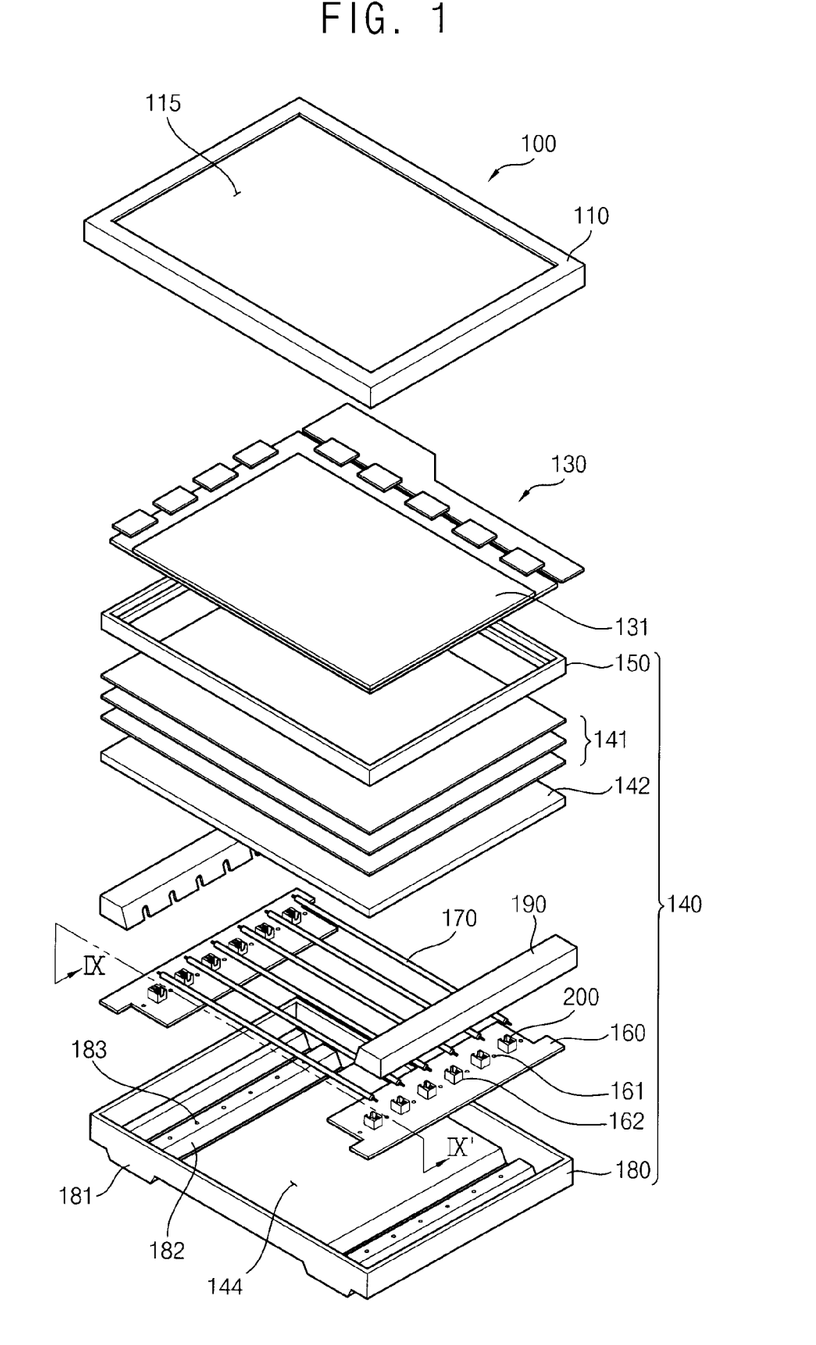
FIG. 1 is an exploded perspective view of a liquid crystal display according to an exemplary embodiment of the present invention.

FIG. 1 is an exploded perspective view a liquid crystal display ("LCD") 100 according to an exemplary embodiment of the present invention. Referring to FIG. 1, the liquid crystal display 100 according to an exemplary embodiment includes a liquid crystal panel assembly 130, a backlight assembly 140, a printed circuit board ("PCB") 160 and an upper receiving container 110.

The liquid crystal panel assembly 130 includes a liquid crystal panel 131. The liquid crystal panel 131 includes a pair of glass substrates, and a liquid crystal layer (not shown) provided therebetween.

The backlight assembly 140 includes optical sheets 141, an optical plate 142, lamps 170, and a reflective plate 144.

In an exemplary embodiment of the present invention, the lamps 170 are light emitting diodes ("LEDs"), for example, or, alternatively, may be cold cathode fluorescent lamps ("CCFLs"), external electrode fluorescent lamps ("EEFLs"), or any other type of light emitting device. The lamps 170 generate light using a lamp driving voltage applied to the lamps 170 from an external source (not shown). According to an exemplary embodiment of the present invention the lamps 170 are spaced apart from each other by a predetermined distance and longitudinal axes thereof are oriented substantially in parallel to each other in a given plane, as shown in FIG. 1. Thus, the lamps 170 according to an exemplary embodiment form a structure which supplies the light to the liquid crystal panel 131. To provide light having a uniform brightness, a discharge gas is uniformly distributed in the lamps 170. Further, the lamps 170 may be arranged substantially horizontally (as viewed in FIG. 1) with respect to the liquid crystal panel 131.

Lamp socket units 200 are inserted into cutout portions 162 formed on the printed circuit board 160. The lamp socket units 200 are positioned to correspond to opposite end portions of the lamps 170. The lamp sockets securely support the lamps 170. The lamp socket units 200 will be described in further detail below.

The printed circuit board 160 includes the cutout portions 162, described above, and a coupling hole 161 formed on the printed circuit board 160 at a position between adjacent cutout portions 162.

The optical plate 142 disposed above the lamps 170, and enhances the uniformity of the brightness of the light generated by the lamps 170.

The reflective plate 144 is disposed below the lamps 170, e.g., on an opposite side of the lamps 170 than the optical plate 142, and reflects the light the lamps 170 upward toward the optical plate 142.

In an exemplary embodiment, the optical sheets 141 are disposed on the optical plate 142. Further, the optical sheets 141 diffuse and/or focus the light from the lamps 170.

The backlight assembly 140 includes a receiving frame 150 and a lower receiving container 180 for receiving the optical sheets 141, the optical plate 142, the lamps 170 and the reflective plate 144, as shown in FIG. 1.

Specifically, the receiving frame 150 according to an exemplary embodiment has sidewalls extending from peripheral edges of a lower, e.g., bottom surface thereof. Thus, the lower receiving container 180 receives the optical sheets 141, the optical plate 142, the lamps 170, the reflective plate 144, the printed circuit board 160, the lamp socket unit 200, a side mold 190, and the liquid crystal panel assembly 130 in an area defined by the sidewalls extending from the peripheral edges of the bottom surface of the lower receiving container 180. In an exemplary embodiment of the present invention, the lower receiving container 180 prevents bending of the optical sheets 141.

Still referring to FIG. 1, the lower receiving container 180 includes at least one recess 181 formed at a position corresponding to a position of the printed circuit board 160 thereabove in a direction substantially perpendicular to the longitudinal axis of the lamp 170. In addition, the lower receiving container 180 according to an exemplary embodiment includes a fixing boss 182, which contacts the printed circuit 160, formed on an inner surface of the recess 181 and at the position corresponding to the position of the printed circuit board 160. The lower receiving container 180 further includes a fixing hole 183 formed on the fixing boss 182 at a position corresponding to a position of the coupling hole 161. In an exemplary embodiment of the present invention, the fixing boss 182 is formed from separate components, or, alternatively, may be formed integrally, e.g., as one component. In an exemplary embodiment of the present invention wherein the fixing boss 182 is formed integrally, e.g., as one body, the fixing boss 182 is formed to be aligned in a direction substantially perpendicular to the longitudinal direction of the lamp 170.

The lower receiving container 180 is coupled to the upper receiving container 110. Specifically, a periphery of an upper surface of the liquid crystal panel assembly 130, received in the lower receiving container 180, is thereby covered, as shown in FIG. 1. An aperture 115, e.g. a window 115, which exposes at least a portion, such as a viewing portion, of the liquid crystal panel assembly 130 to a user viewing the liquid crystal display is formed through an upper, e.g., a top, surface of the upper receiving container 110.

Figure 2:
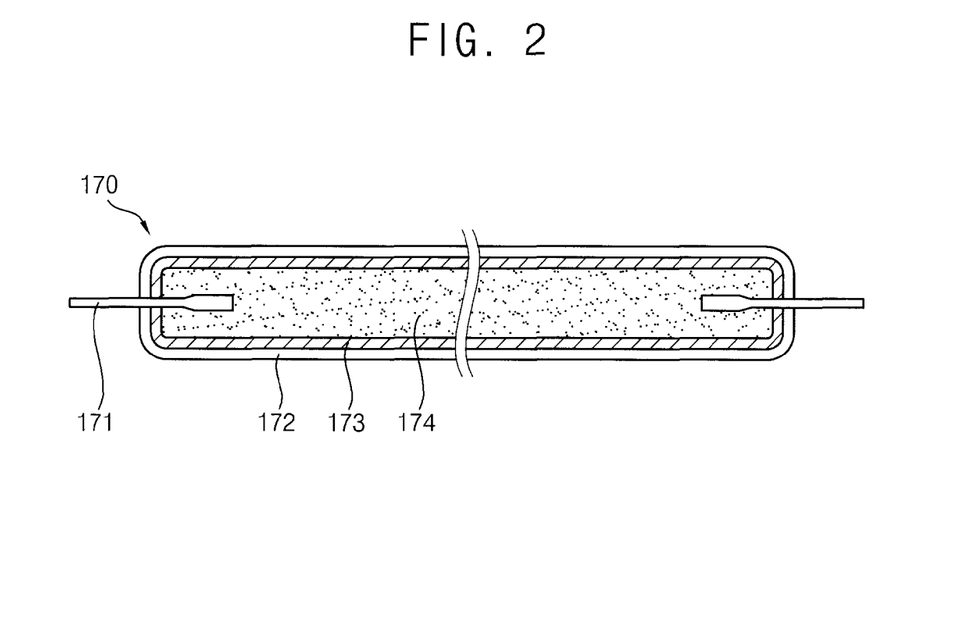
FIG. 2 is a partial cross-sectional view of a lamp used in a liquid crystal display according to an exemplary embodiment of the present invention.

FIG. 2 is a partial cross-sectional view of the lamp 170 in a liquid crystal display according to an exemplary embodiment of the present invention. Referring to FIG. 2, a plurality of the lamps 170 includes the lamps 170 having longitudinal axes thereof arranged substantially in parallel and disposed at regular intervals along a latitudinal axis thereof. Each of the lamps 170 includes a lamp tube 172, and electrodes 171 formed at opposite ends of the lamp tube 172. A fluorescent material layer 173 is coated on an inner surface of the lamp tube 172, and the lamp tube 172 is filled with a discharge gas 174. The electrodes 171 are electrically connected to the printed circuit boards 160 through socket terminals 220 (FIG. 4) of the lamp socket unit 200. Thus, the electrodes receive electricity from the printed circuit boards 160 and supply it to the lamps 170.

Figure 3:
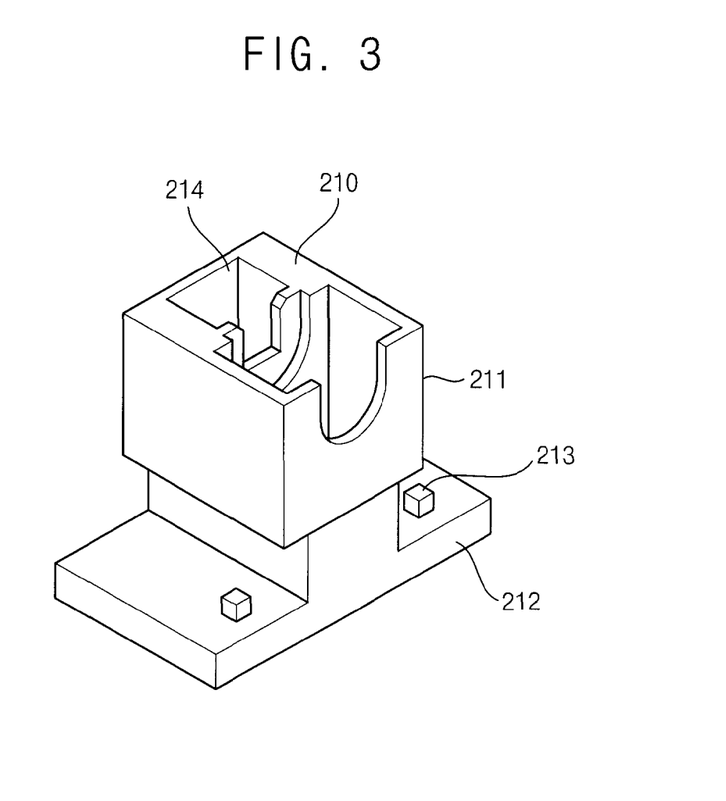
FIG. 3 is a front perspective view of a socket housing of a liquid crystal display according to an exemplary embodiment of the present invention.
Figure 4:
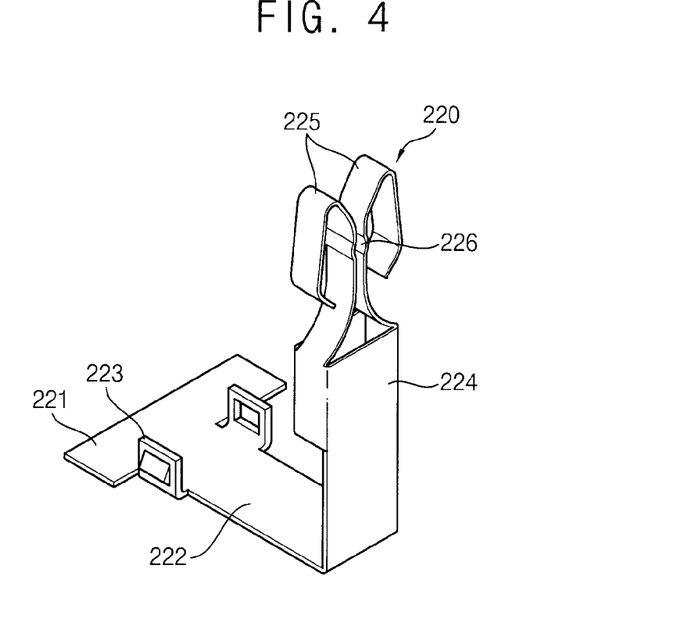
FIG. 4 is a front perspective view of a socket terminal of a liquid crystal display according to an exemplary embodiment of the present invention.
Figure 5:
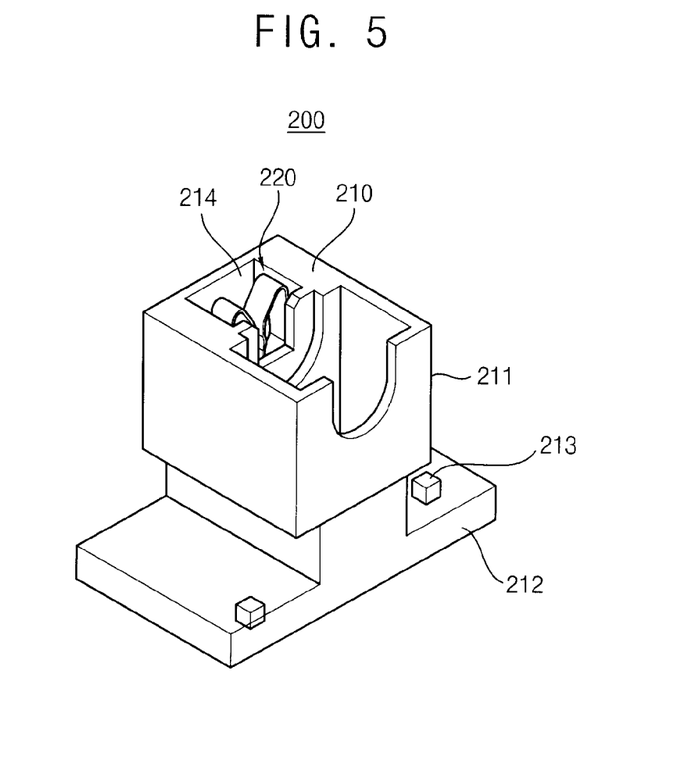
FIG. 5 is a front perspective view of a lamp socket unit of a liquid crystal display according to an exemplary embodiment of the present invention.

FIG. 3 is a front perspective view of a socket housing of a liquid crystal display according to an exemplary embodiment of the present invention, FIG. 4 is a front perspective view of a socket terminal of a liquid crystal display according to an exemplary embodiment of the present invention, and FIG. 5 is a front perspective view of a lamp socket unit of a liquid crystal display according to an exemplary embodiment of the present invention. Referring to FIGS. 3 to 5, a lamp socket unit 200 includes a socket housing 210 and the socket terminals 220. Each socket terminal 220 is coupled to a corresponding socket housing 210. Thus, the socket terminal 220 fixes the electrodes 171.

Referring now to FIG. 3, the socket housing 210 includes a main portion 211, a base portion 212 and a fixing protrusion 213. The main portion 211 includes a guide groove (not shown) to permit the lamp 170 to be inserted into the socket housing 210. A terminal receiving space 214 is formed inside the socket housing 210. A groove portion (not shown) is formed between the main portion 211 and the base portion 212. As a result, when the socket housing 210 is coupled to the printed circuit board 160 (FIG. 1), an edge of the cutout portion 162 of the PCB 160 (FIG. 1) is fitted into the groove portion, thereby securely fixing the socket housing 210 to the printed circuit board 160.

The fixing protrusion 213 is formed to correspond to a position where the printed circuit board 160 overlaps with the base portion 212 of the socket housing 210. In an exemplary embodiment of the present invention, the socket housing 210 is made of an insulating material, for example.

Referring to FIG. 4, the socket terminal 220 includes a substrate connecting portion 221 electrically connected to the printed circuit board 160 (FIG. 1), a horizontal extension portion 222 extending substantially horizontally away from the substrate connection portion 221, coupling portions 223 extending substantially vertically from opposite sides of a first end of the horizontal extension portion 222 substantially adjacent to the substrate connection portion 221, and a vertical extension portion 224 extending substantially vertically from an opposite second end of the horizontal extension portion 222. An electrode gripping portion 225 is formed on an upper portion of the vertical extension portion 224, as shown in FIG. 4.

Portions of the electrode gripping portion 225 are bent such that electrode coupling portions 226 are formed substantially tips of the portions of the electrode gripping portion 225. As a result, when an electrode 171 of the lamp 170 is inserted into the electrode coupling portion 226, the electrode gripping portion 225 elastically deforms such that the electrode 171 of the lamp 170 fits between the portions of the electrode coupling portion 226. Thereafter, the portions return to their original, e.g., non-deformed, shape to secure the electrode 171 therebetween.

Referring now to FIG. 5, the socket terminal 220 is coupled to the socket housing 210. The coupling portion 223 of the socket terminal 220 is inserted into a terminal fixing slot (not shown) formed inside the socket housing 210. A tip of the electrode gripping portion 225 is positioned at an upper end of the terminal receiving space 214. The substrate connection portion 221 is thus be directly electrically connected to the printed circuit board 160 or, in an alternative exemplary embodiment, may be indirectly electrically connected to the printed circuit board 160 us a wire (not shown), for example.

Figure 6:
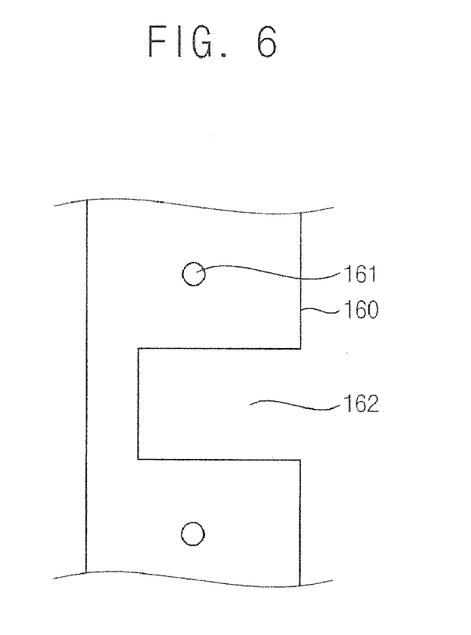
FIG. 6 is a plan view of a printed circuit board of a liquid crystal display according to an exemplary embodiment of the present invention.

FIG. 6 is a plan view of the printed circuit board 160 of a liquid crystal display according to an exemplary embodiment of the present invention. Referring to FIG. 6, the printed circuit board 160 includes the coupling hole 161 and the cutout portions 162, as described above in greater detail. Specifically, a given coupling hole 161 of the printed circuit board 160 is formed on the printed circuit board 160 at a position between the adjacent cutout portions 162. In addition, the cutout portion 162 has a shape substantially corresponding to a shape of the socket housing 210. Therefore, when the socket housing 210 is coupled to the cutout portion 162, an opening is not formed between the socket housing 210 and the cutout portion 162. According to the exemplary embodiment of the present invention shown in FIG. 6, the cutout portion 162 forms a substantially "T"-shaped opening, but alternative exemplary embodiments are not limited thereto. Instead, the cutout portion 162 according to an alternative exemplary embodiment may be formed in various shapes. Likewise, the printed circuit board 160 according to the exemplary embodiment of the present invention shown in FIG. 6, has a substantially circular shape, but the shape of the coupling hole 161 is not limited thereto, and may instead be shaped in various alternative manners.

The printed circuit board 160 according to an exemplary embodiment of the present invention includes a thin coat of electrically conductive material applied in a pattern on an insulating substrate (not shown). Specifically, copper, for example, may be used as the electrically conductive material, but alternative exemplary embodiments are not limited thereto.

Figure 7:
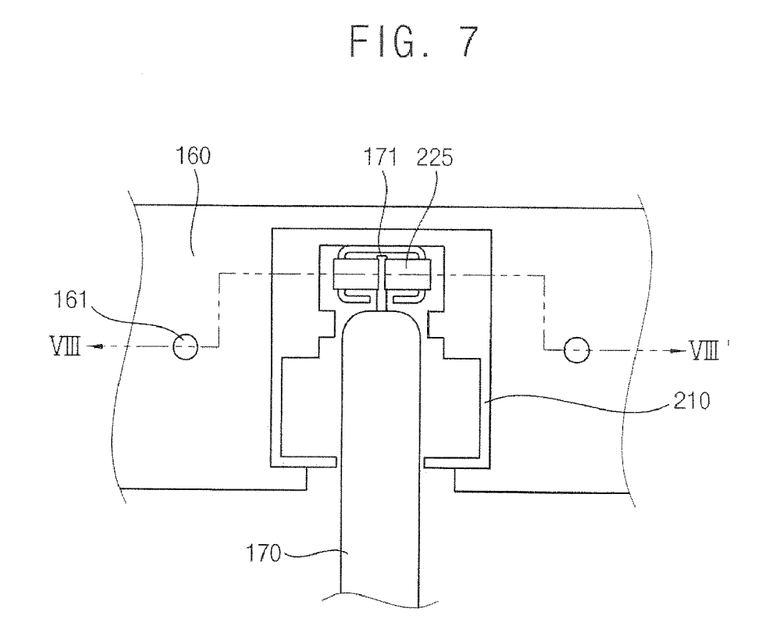
FIG. 7 is a plan view of the socket housing of the exemplary embodiment of the present invention shown in FIG. 3 coupled to the printed circuit board according to the exemplary embodiment of the present invention shown in FIG. 6.

FIG. 7 is a plan view of the socket housing 210 coupled to the printed circuit board 160. Referring to FIG. 7, in an exemplary embodiment of the present invention, the lamp socket unit 200 and the printed circuit board 160 are coupled and disposed inside the lower receiving container 180. Specifically, as shown in FIG. 7, the coupling hole 161 is formed substantially adjacent to the socket housing 210 on the printed circuit board 160. The electrode gripping portion 225 of the lamp terminal 220 holds the lamp electrode 171 of the lamp 170.

Figure 8:
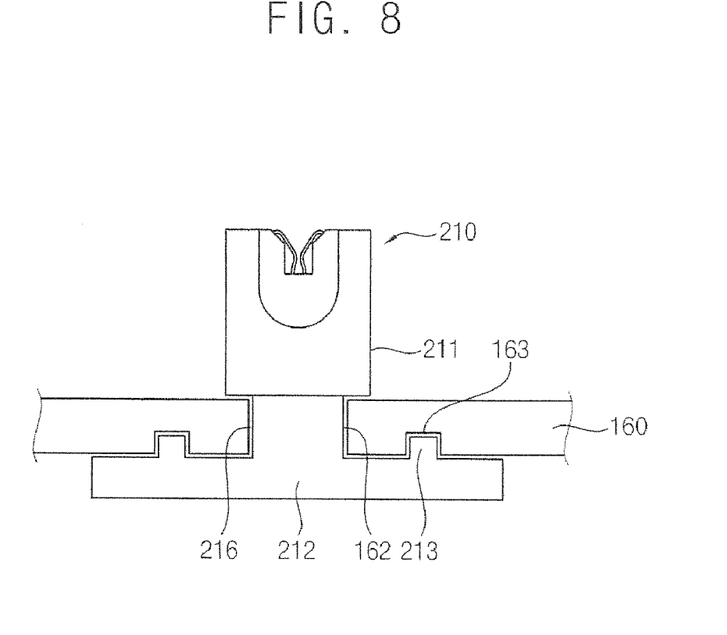
FIG. 8 is a partial cross-sectional view taken along line VIII-VIII' of FIG. 7.

FIG. 8 is a partial cross-sectional view taken along line VIII-VIII' of FIG. 7. Referring to FIG. 8, the socket housing 210 is coupled to the printed circuit board 160. Specifically, the fixing protrusion 213 formed on the base portion 212 of the socket housing 210 is inserted into a fixing groove 163 formed on a lower, e.g., a bottom, surface of the printed circuit board 160. Thus, by coupling the fixing protrusion 213 to the fixing groove 163, the socket housing 210 is fixed in the printed circuit board 160. An edge of the cutout portion 162 fits into the groove 216 formed between the main portion 211 of the socket housing 210 and the base portion 212 of the socket housing 210. Thus, in an exemplary embodiment of the present invention as shown in FIG. 8, a number of parts required to manufacture a backlight assembly is substantially reduced and/or effectively minimized.

Figure 9:
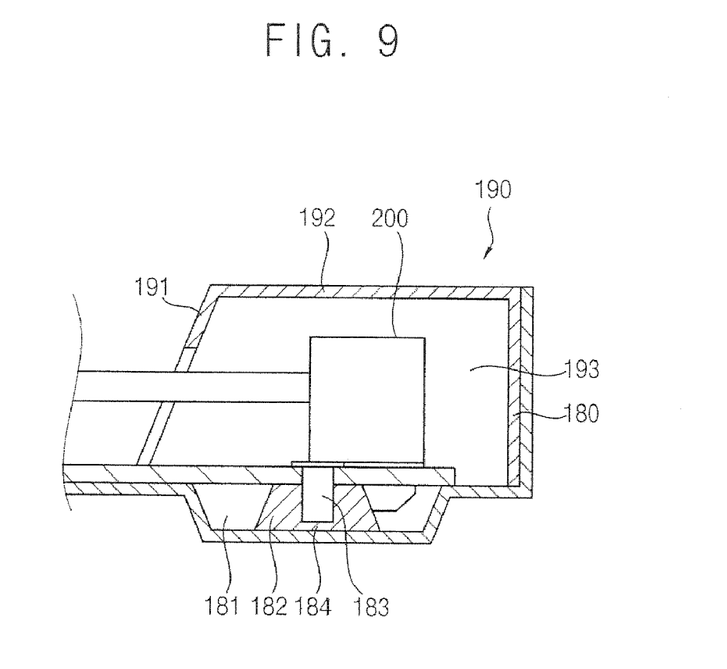
FIG. 9 is a partial cross-sectional view taken along line IX-IX' of FIG. 1.

FIG. 9 is a partial cross-sectional view taken along line IX-IX' of FIG. 1. Referring to FIG. 9, one of the side molds 190 is disposed at opposite peripheral edge portions of the lower receiving container 180 and extends in a substantially perpendicular direction relative to the longitudinal axis of the lamp 170. The side mold 190 includes an inclined surface 191 which is inclined away from the bottom plate of the lower receiving container 180. The side mold 190 also includes a supporting surface 192. Thus, the inclined surface 191 of the side mold 190, the supporting surface 192 of the side mold 190, and the sidewalls of the lower receiving container 180 form a receiving space 193 which accommodates the lamp socket unit 200 and printed circuit board 160. The inclined surface 191 includes an aperture, e.g., an opening, (not shown) formed therethrough at a position substantially corresponding to a position of the lamp 170. Thus, the lamp 170 is inserted through the opening of the inclined surface 191. The side mold 190 according to an exemplary embodiment of the present invention prevents light leakage, blocks heat transfer and/or supports the optical sheets 141 and the optical plate 142.

Still referring to FIG. 9, the lower receiving container 180 includes a recess 181 formed at a position corresponding to the position of the printed circuit board 160 aligned in a direction substantially perpendicular to the longitudinal axis of the lamp 170. A fixing boss 182 is formed on an inner surface of the recess 181 at a position corresponding to the position of the coupling hole 161 formed on the printed circuit board 160. A thickness of the fixing boss 182 is sufficient such that the fixing boss 182 contacts the printed circuit board 160. The fixing boss 182 includes a fixing hole 183 formed therethrough at a position substantially corresponding to the position of the coupling hole 161. A coupling member 184 is inserted through the fixing hole 183 and the coupling hole 161 to fix the printed circuit board 160 to the lower receiving container 180.

In an exemplary embodiment of the present invention, the fixing boss 182 is formed integral to, e.g., as one component including the lower receiving container 180. In this case, a coupling member 184 may be inserted either from a rear surface of the recess 181 or, alternatively, from an opposite front surface, e.g., from the printed circuit board 160. In an exemplary embodiment of the present invention, the coupling member 184 is a screw, but alternative exemplary embodiments of the present invention are not limited thereto. The coupling member 184 reduces electromagnetic interference by forming an electrical ground between the printed circuit board 160 and the lower receiving container 180 to discharge unwanted electric current, e.g., electrical noise, therethrough. In an exemplary embodiment, the fixing boss 182 is formed as a single body which extends in a direction substantially perpendicular to the longitudinal axis of the lamp 170.

In an alternative exemplary embodiment, however, the fixing boss 182 may be formed as a plurality of separate fixing bosses 182 arranged substantially in parallel with one another and having regular intervals therebetween. In addition, the lower receiving container 180 according to an exemplary embodiment may be made of metal or, alternatively, resin, for example, but alternative exemplary embodiments of the present invention are not limited thereto.

Figure 10A:
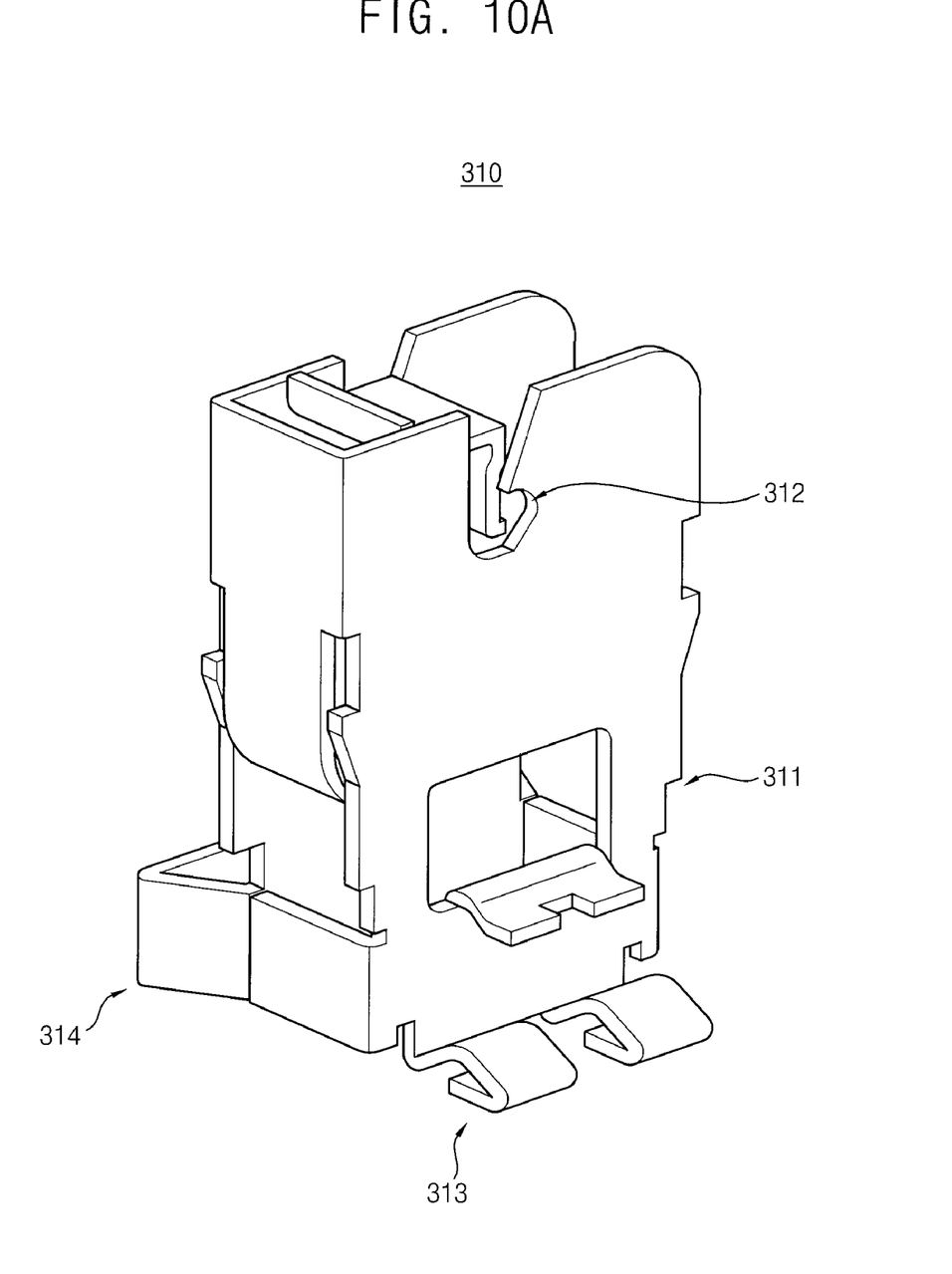
FIG. 10A is a front perspective view of a lamp socket of a liquid crystal display according to an alternative exemplary embodiment of the present invention.
Figure 10B:
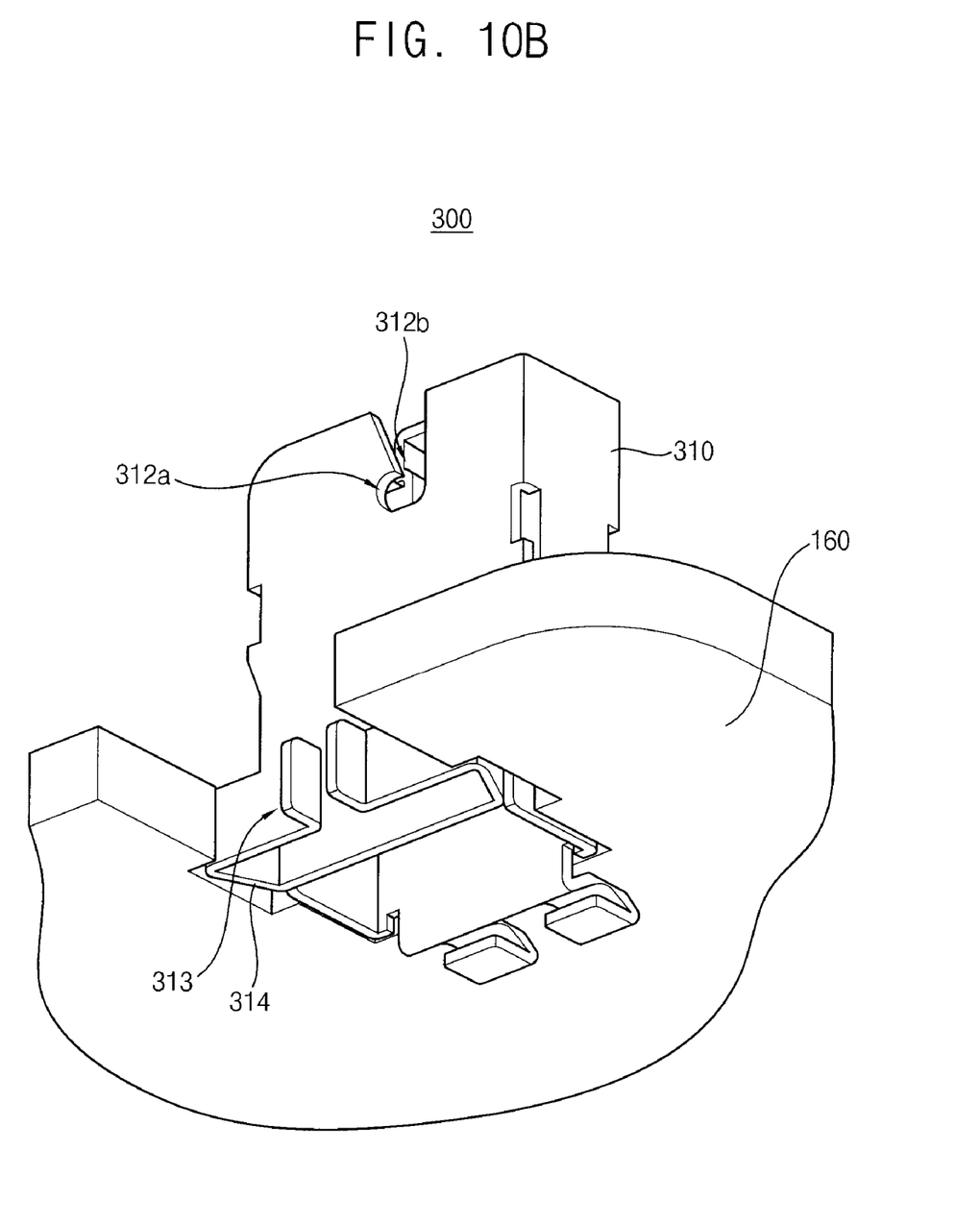
FIG. 10B is a bottom perspective view of the lamp socket of the liquid crystal display according to the exemplary embodiment of the present invention shown in FIG. 10A.
Figure 11:
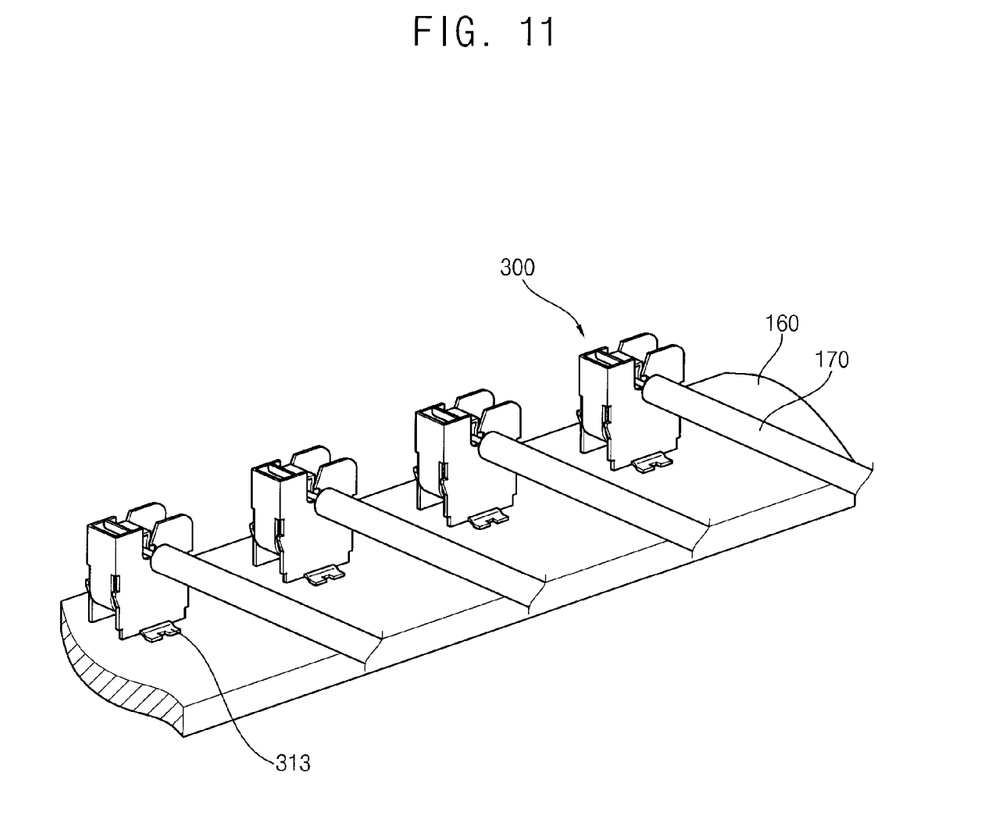
FIG. 11 is a front perspective view of the lamp socket according to the exemplary embodiment of the present invention shown in FIG. 10A coupled to a printed circuit board of a liquid crystal display according to an alternative exemplary embodiment of the present invention.

FIG. 10A is a front perspective view of a lamp socket of a liquid crystal display according to an alternative exemplary embodiment of the present invention, FIG. 10B is a bottom perspective view of the lamp socket of the liquid crystal display according to the exemplary embodiment of the present invention shown in FIG. 10A, and FIG. 11 is a front perspective view of the lamp socket according to the exemplary embodiment of the present invention shown in FIG. 10A coupled to a printed circuit board of a liquid crystal display according to an alternative exemplary embodiment of the present invention In an alternative exemplary embodiment of the present invention, a lamp socket unit 300 comprises a lamp socket 310. Further, the lamp socket 310 is directly coupled to the printed circuit board 160.

Referring to FIGS. 10A to 11, the lamp socket 310 includes a main body 311, an electrode gripping portion 312, a first printed circuit board coupling portion 313 and a second printed circuit board coupling portion 314. The electrode gripping portion 312 is formed at an upper part of the main body 311, a shown in FIG. 10A. The electrode gripping portion 312 includes an electrode receiving groove 312a and an electrode holding portion 312b. The electrode holding portion 312b is elastically deformed (and subsequently restored) when the electrode 171 is pushed in from above. The electrode holding portion 312b is disposed inside the electrode receiving groove 312a, and the electrode holding portion 312b thereby secures the electrode 171 inside the electrode receiving groove 312a. The first printed circuit board coupling portion 313 is formed at a lower part of the main body 311 on a surface substantially facing, e.g., disposed opposite to, the lamp tube 172. The first printed circuit board coupling portion 313 thus defines a fitting gap 315 which receives a peripheral edge portion of the printed circuit board 160. The second printed circuit board coupling portion 314 protrudes from a lower portion of opposite side walls of the main body 311 and fits inside the receiving space 163 formed in the printed circuit board 160.

Referring to FIG. 11, the lamp socket 310 is coupled to the printed circuit board 160. A portion of the first printed circuit board coupling portion 313 which contacts the printed circuit board 160 electrically connects the lamp socket 310 and the printed circuit board 160. Thus, the first printed circuit board coupling portion 313 and the second printed circuit board coupling portion 314 fix the lamp socket 310. In an exemplary embodiment of the present invention, the lamp socket 310 is made of metal, for example.

A plurality of the lamp sockets 310 may be arranged substantially in parallel with one another and disposed at regular intervals. Thus, each lamp socket 310 of the plurality of lamp sockets 310 accommodates lamp electrode 171 of each lamp 170.

Thus, a backlight assembly according to an exemplary embodiment of the present invention includes a lamp socket unit and a printed circuit board. The backlight assembly according to an exemplary embodiment provides advantages including, but not limited to, easy assembly and reduced manufacturing cost. Exemplary embodiments of the present invention also provide a liquid crystal display including the backlight assembly, and a method of manufacturing the backlight assembly.

The present invention should not be construed as being limited to the exemplary embodiments set forth herein. Rather, these exemplary embodiments are provided so that this disclosure will be thorough and complete and will fully convey the concept of the present invention to those skilled in the art. The exemplary embodiments of the present invention as described herein are in all respects as illustrative and not restrictive While the present invention has been particularly shown and described with reference to the exemplary embodiments thereof, it will be understood by those of ordinary skill in the art that various changes in form and details may be made therein without departing from the spirit or scope of the present invention as defined by the following claims.

What is claimed is:

1. A backlight assembly comprising:
   a lamp socket unit;
   a printed circuit board comprising a cut-out portion in which the lamp socket unit is inserted therethrough, the lamp socket unit being disposed in the cut-out portion to be received in the printed circuit board; and
   a lower receiving container which receives the lamp socket unit and the printed circuit board, wherein
   the printed circuit board having the lamp socket unit coupled thereto is disposed in the lower receiving container, and the lamp socket unit contacts both a lower surface and an upper surface defining the printed circuit board.

2. The backlight assembly of claim 1, wherein the lamp socket unit comprises:
   a socket terminal; and
   a socket housing which receives the socket terminal, wherein
   the socket housing comprises a base portion and a main portion extending in a substantially perpendicular direction away from the base portion, and
   the base portion is coupled to the printed circuit board.

3. The backlight assembly of claim 2, wherein
   the main portion comprises a terminal receiving space formed therethrough, and
   the terminal receiving space receives the socket terminal of the lamp socket unit therethrough.

4. The backlight assembly of claim 3, wherein
   the printed circuit board further comprises a fixing groove formed around the cutout portion of the printed circuit board on the lower surface thereof, and
   the socket housing is inserted into the cut-out portion of the printed circuit board.

5. The backlight assembly of claim 4, wherein the socket housing further comprises a fixing protrusion formed on the base portion thereof at a position substantially corresponding to a position of the fixing groove of the printed circuit board when the fixing protrusion is coupled to the fixing groove when the socket housing is inserted into the cut-out portion of the printed circuit board.

6. The backlight assembly of claim 5, the printed circuit board further comprising:
   a plurality of the cut-out portions; and
   a coupling aperture formed through the printed circuit board, wherein the coupling aperture is disposed between adjacent cut-out portions of the plurality of cut-out portions.

7. The backlight assembly of claim 6, wherein the lower receiving container comprises:
   a bottom surface; and
      a recess formed in the bottom surface,
      a position of the recess corresponds to a position of the lamp socket disposed in the lower receiving container,
   the recess extends away from the lamp socket,
   a fixing boss is formed on a surface of the recess facing the printed circuit board disposed therein, and
   the fixing boss contacts the printed circuit board when the printed circuit board is disposed in the lower receiving container.

8. The backlight assembly of claim 7, wherein the fixing boss comprises a fixing aperture formed thereon at a position corresponding to a position df the coupling aperture of the printed circuit board when the printed circuit board is disposed in the lower receiving container.

9. The backlight assembly of claim 8, further comprising a coupling member inserted through the fixing aperture and the coupling aperture to fix the printed, circuit to the lower receiving container.

10. The backlight assembly of claim 9, wherein the coupling member comprises a screw.

11. The backlight assembly of claim 9, further comprising a side mold and a lamp disposed in the lower receiving container, wherein
    the side mold is disposed at a peripheral edge of the lower receiving container,
    a longitudinal axis of the side mold extends in a substantially perpendicular direction relative to a longitudinal axis of the lamp, and
    the side mold covers an end portion of the lamp.

12. The backlight assembly of claim 2, wherein the socket terminal comprises:
    a main body;
    an electrode gripping portion disposed at an upper portion of the main body;
    a first printed circuit board coupling portion disposed at a lower portion of the main body on a first side of the main body; and
    a second printed circuit board coupling portion disposed at the lower portion of the main body on a second side of the main body, the second side being opposite to the first side.

13. The backlight assembly of claim 12, wherein the electrode gripping portion is an extension of the main body.

14. The backlight assembly of claim 13, wherein the electrode gripping portion comprises:
    an electrode receiving groove formed in the main body; and
    an electrode holding portion disposed in the electrode receiving groove and which receives an electrode of the lamp.

15. The backlight assembly of claim 14, wherein the first side of the main body faces the lamp disposed in the lower receiving container.

16. The backlight assembly of claim 15, wherein the second circuit board coupling portion protrudes from opposite side walls of the lower portion of the main body.

17. A liquid crystal display comprising:
    a liquid crystal panel;
    a lamp disposed below the liquid crystal panel;
    a lower receiving container which receives the lamp;
    a lamp socket unit disposed in the lower receiving container and which holds the lamp, the lamp socket unit comprising:
      a socket terminal; and
      a socket housing which receives the socket terminal; and
    a printed circuit board comprising a cut-out portion formed therethrough in which the lamp socket unit is inserted therethrough, the lamp socket unit being disposed in the cut-out portion to be received in the printed circuit board,
    wherein the printed circuit board coupled to the lamp socket is disposed in the lower receiving container.

18. The liquid crystal display of claim 17, wherein
    the printed circuit board further comprises a fixing groove formed around the cutout portion of the printed circuit board on a lower surface thereof,
    the socket housing comprises:
      a base portion coupled to the printed circuit board; and a main portion extending in a substantially perpendicular direction away from the base portion, and the socket housing is inserted into the cut-out portion of the printed circuit board.

19. The liquid crystal display of claim 18, further comprising a plurality of the cut-out portions, wherein the socket housing comprises a fixing protrusion formed on the base portion at a position substantially corresponding to a position of the fixing groove of the printed circuit board when the fixing protrusion is coupled to the fixing groove when the socket housing is inserted into the cut-out portion of the printed circuit board, and the printed circuit board comprises a coupling aperture formed in the printed circuit board at a position between adjacent cut-out portions of the plurality of cut-out portions.

20. The liquid crystal display of claim 19, wherein
the lower receiving container comprises:
a bottom surface; and
a recess formed in the bottom surface,
a position of the recess corresponds to a position of the lamp socket disposed in the lower receiving container,
the recess extends away from the lamp socket,
a fixing boss is formed on a surface of the recess facing the printed circuit board disposed therein, and
the fixing boss contacts the printed circuit board when the printed circuit board is disposed in the lower receiving container.

21. The liquid crystal display of claim 20, further comprising:

a coupling member inserted through the fixing aperture and the coupling aperture to fix the printed circuit to the lower receiving container; and a side mold disposed at a peripheral edge of the lower receiving container, wherein a longitudinal axis of the side mold extends in a substantially perpendicular direction relative to a longitudinal axis of the lamp, and the side mold covers an end portion of the lamp.

22. A method of manufacturing a backlight assembly, the method comprising:

providing a lower receiving container, the lower receiving container comprising:
a bottom surface;
a recess formed in the bottom surface;
a fixing boss disposed in the recess; and
a fixing aperture formed in the fixing boss;

disposing a printed circuit board on the fixing boss in the recess, the printed circuit board comprising:
a cut-out portion formed in the printed circuit board; and
a fixing groove formed on a bottom surface of the printed circuit board around the cut-out portion; and fixing a lamp socket unit in the cut-out portion, the lamp socket unit comprising:
a socket terminal;
and a socket housing which receives the socket terminal, wherein the printed circuit board having the lamp socket unit fixed in the cut-out portion thereof is disposed in the lower receiving container.

23. The method claim 22,
wherein
the fixing aperture is formed through the fixing boss at a position corresponding to a position of a coupling aperture formed in the printed circuit board, and a coupling member is inserted through the fixing aperture and the coupling aperture to fix the printed circuit to the lower receiving container.

* * * * *